July 29, 1969    T. O. METCALFE    3,458,381
MATTRESS PANEL CUTTING AND LABELING MACHINE
Filed Sept. 15, 1965    12 Sheets-Sheet 1

INVENTOR
THOMAS O. METCALFE
BY
Mason, Fenwick & Lawrence
ATTORNEYS

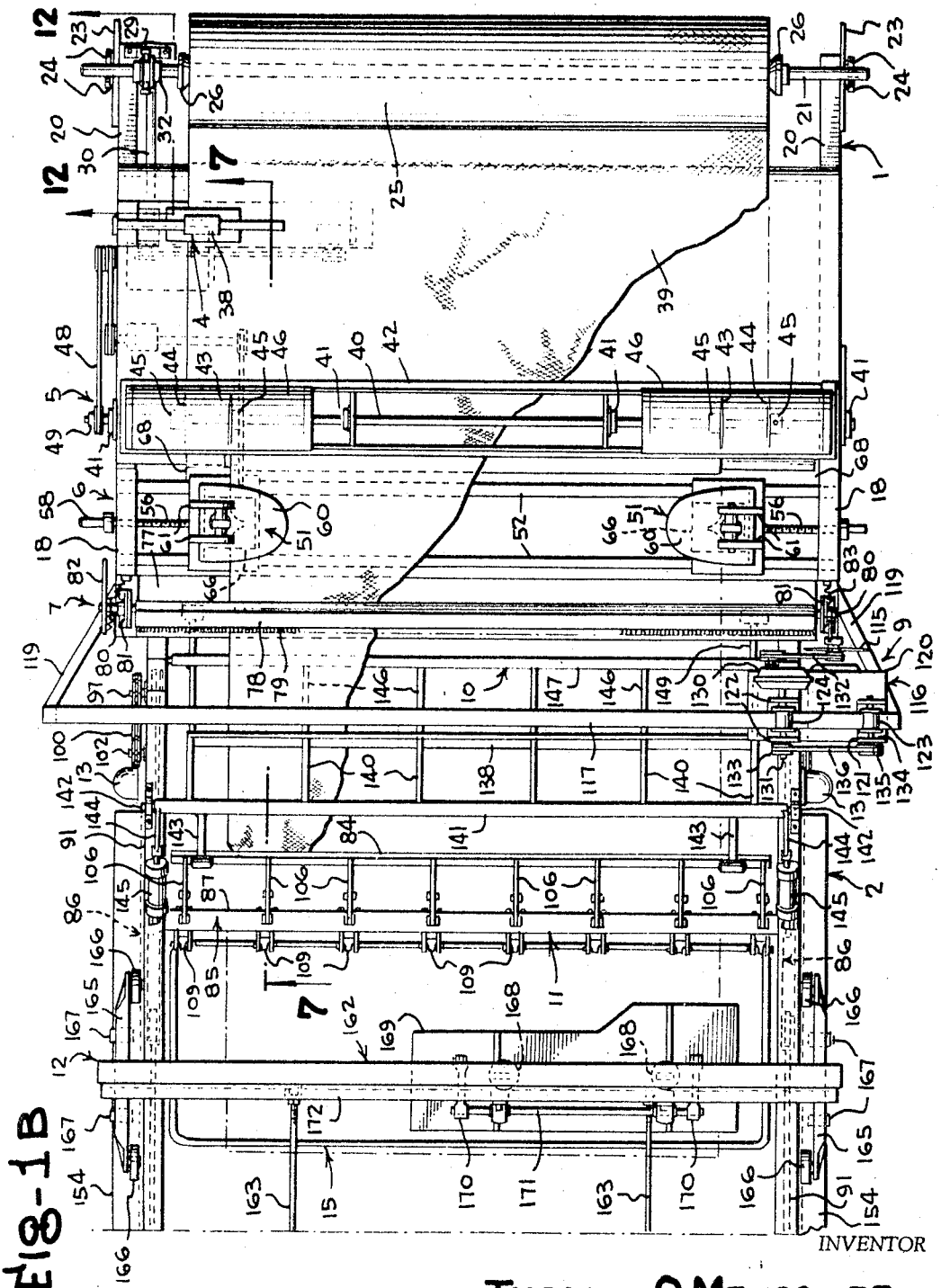

July 29, 1969 T. O. METCALFE 3,458,381
MATTRESS PANEL CUTTING AND LABELING MACHINE
Filed Sept. 15, 1965 12 Sheets-Sheet 3
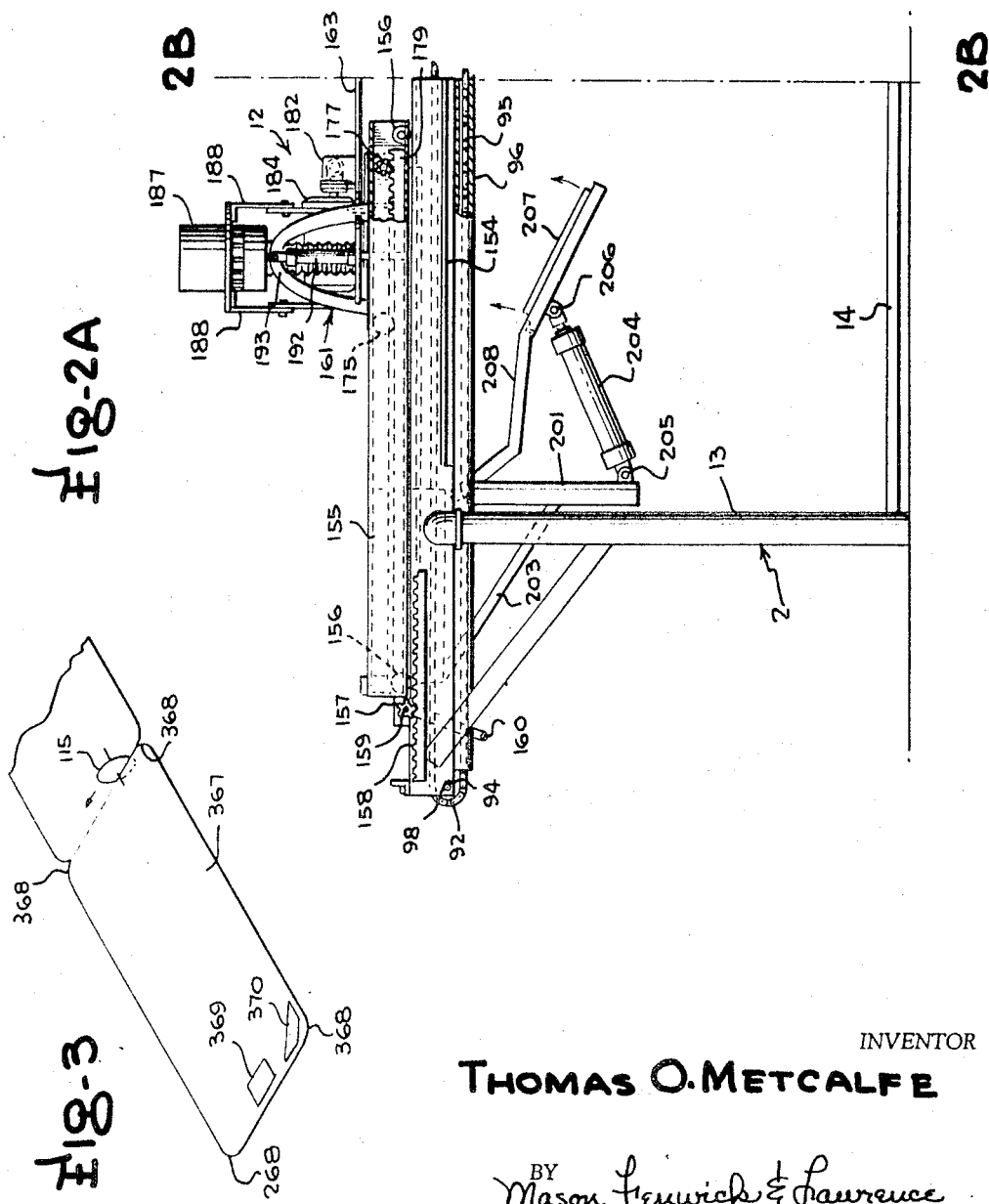
INVENTOR
THOMAS O. METCALFE
BY Mason, Fenwick & Lawrence
ATTORNEYS

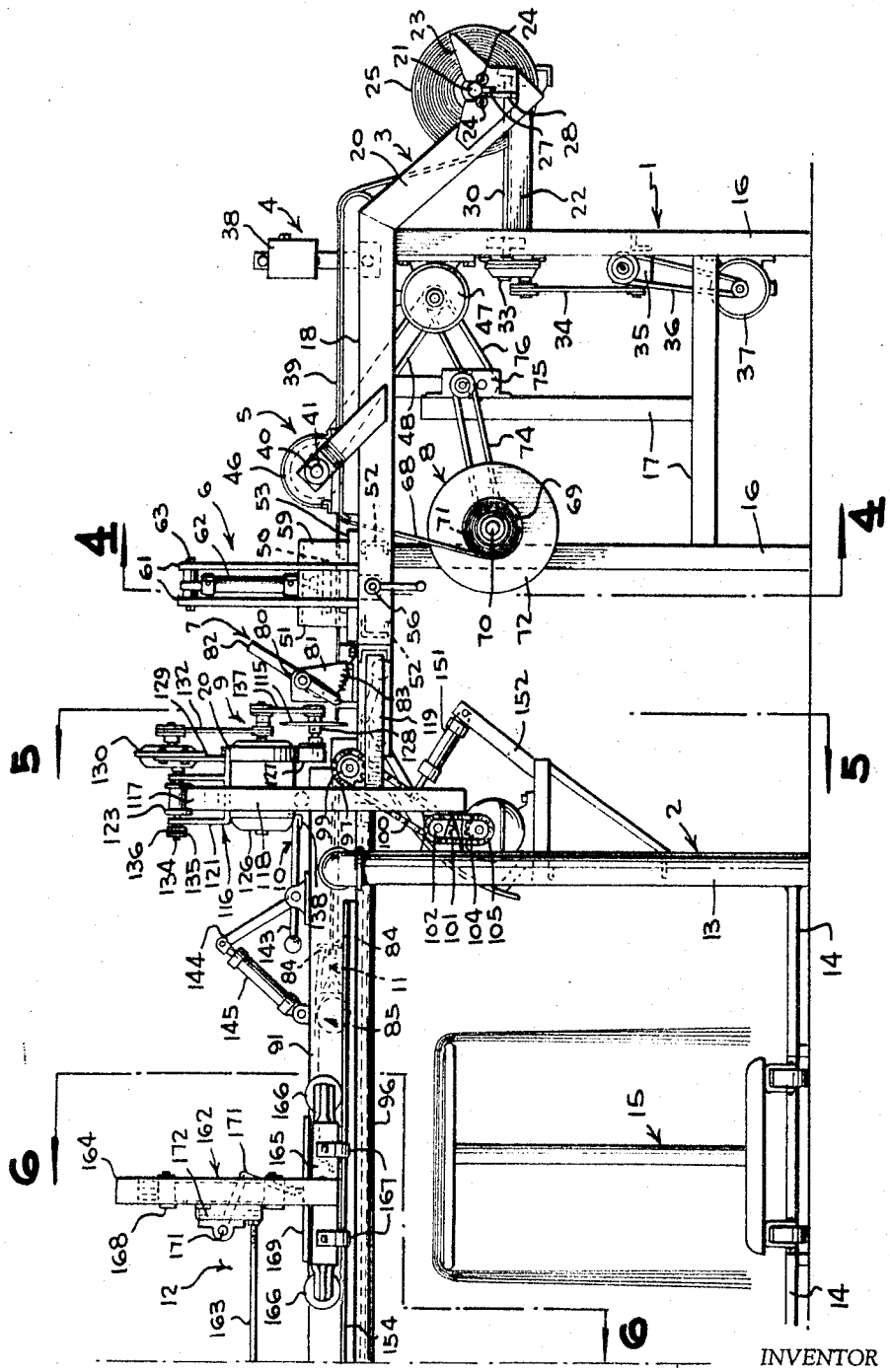

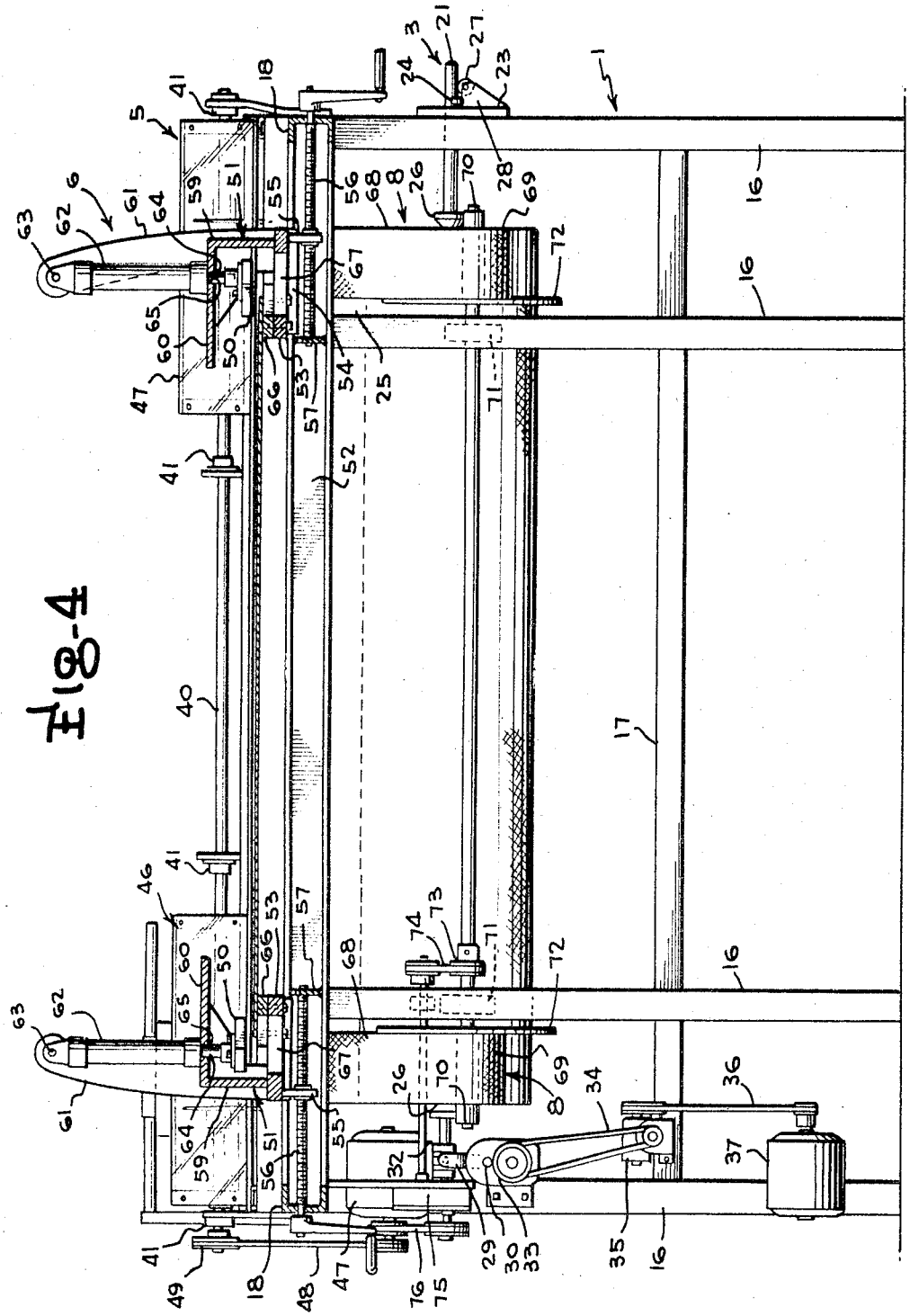

July 29, 1969
T. O. METCALFE
3,458,381
MATTRESS PANEL CUTTING AND LABELING MACHINE
Filed Sept. 15, 1965
12 Sheets-Sheet 6
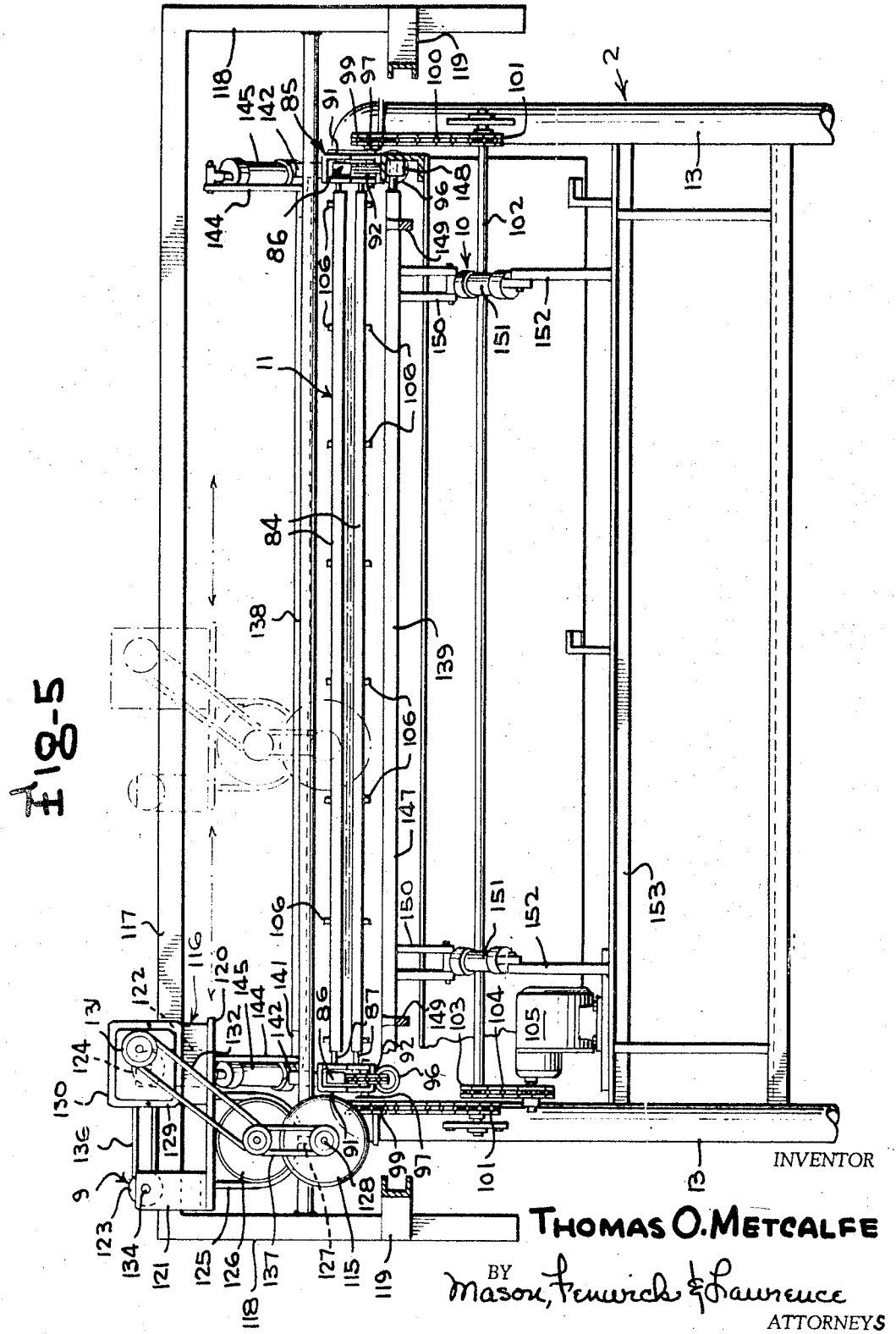
INVENTOR
THOMAS O. METCALFE
BY Mason, Fenwick & Lawrence
ATTORNEYS

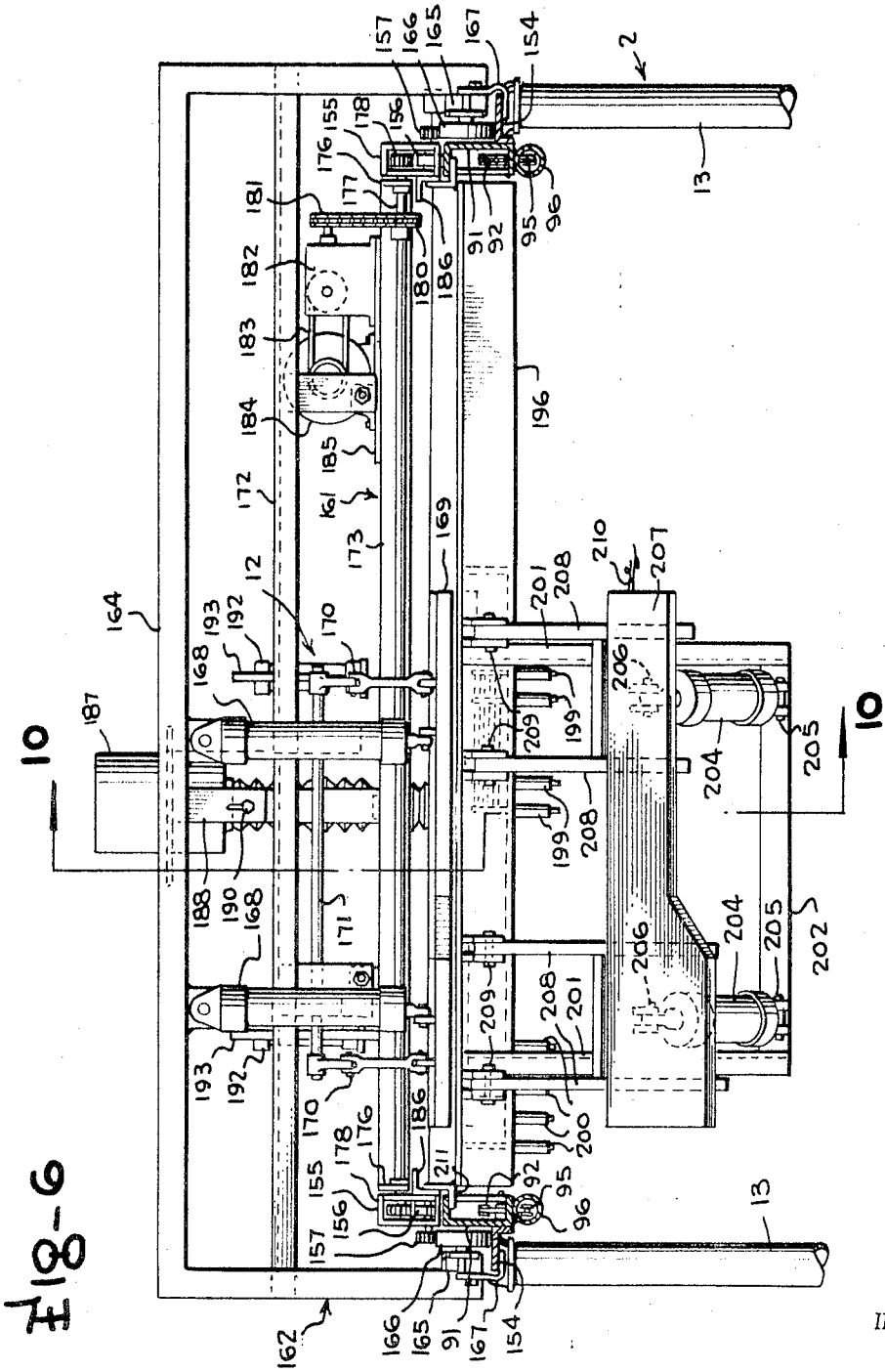

July 29, 1969  T. O. METCALFE  3,458,381
MATTRESS PANEL CUTTING AND LABELING MACHINE
Filed Sept. 15, 1965  12 Sheets-Sheet 8
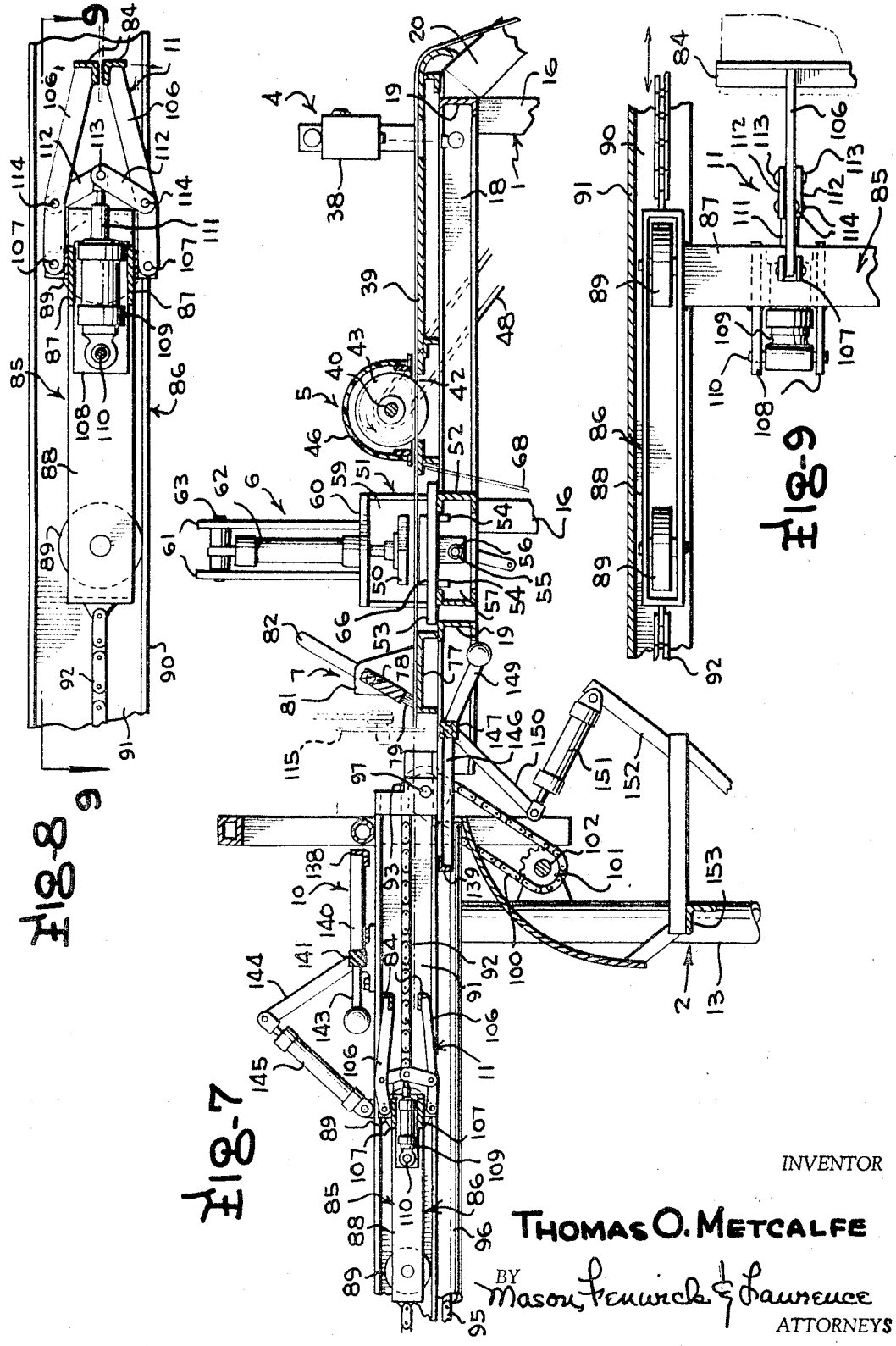
INVENTOR
THOMAS O. METCALFE
BY Mason, Fenwick & Lawrence
ATTORNEYS

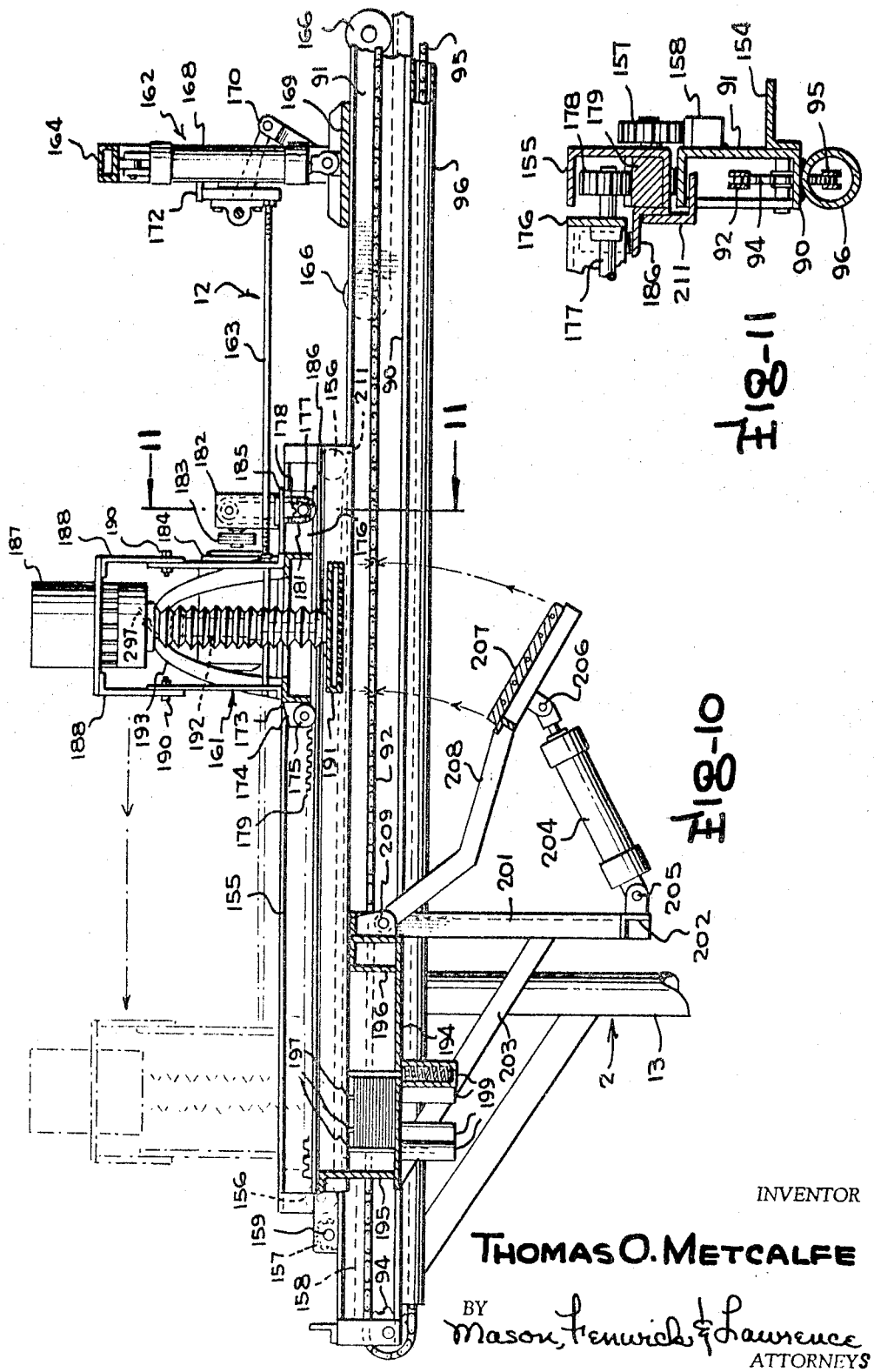

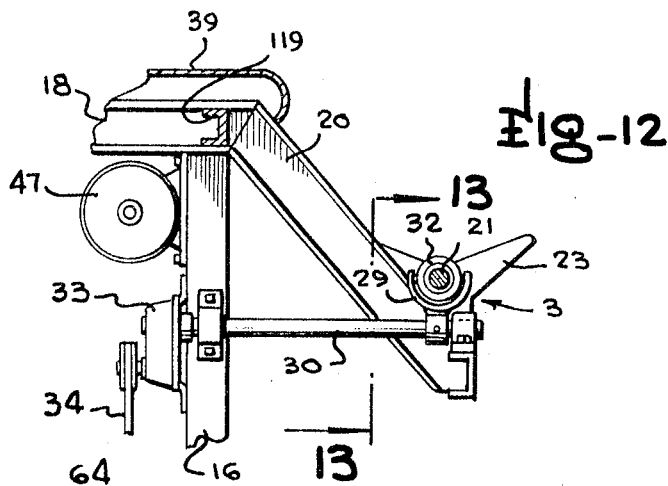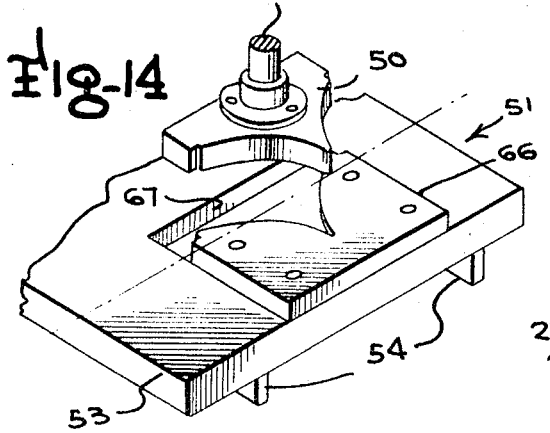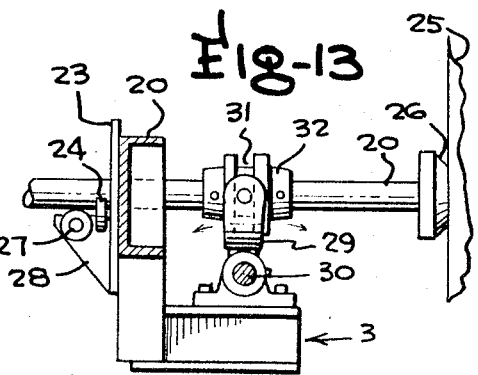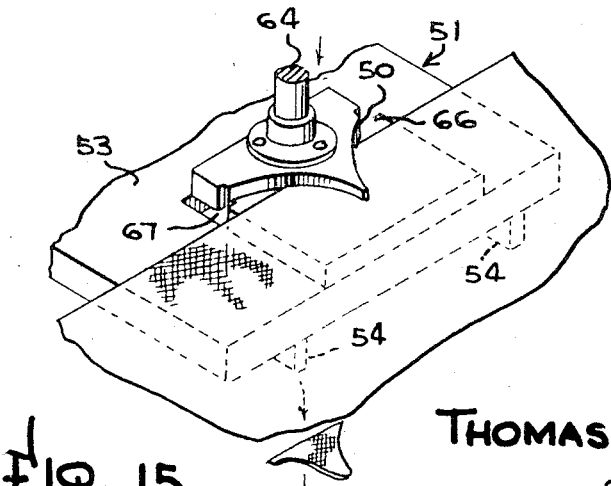

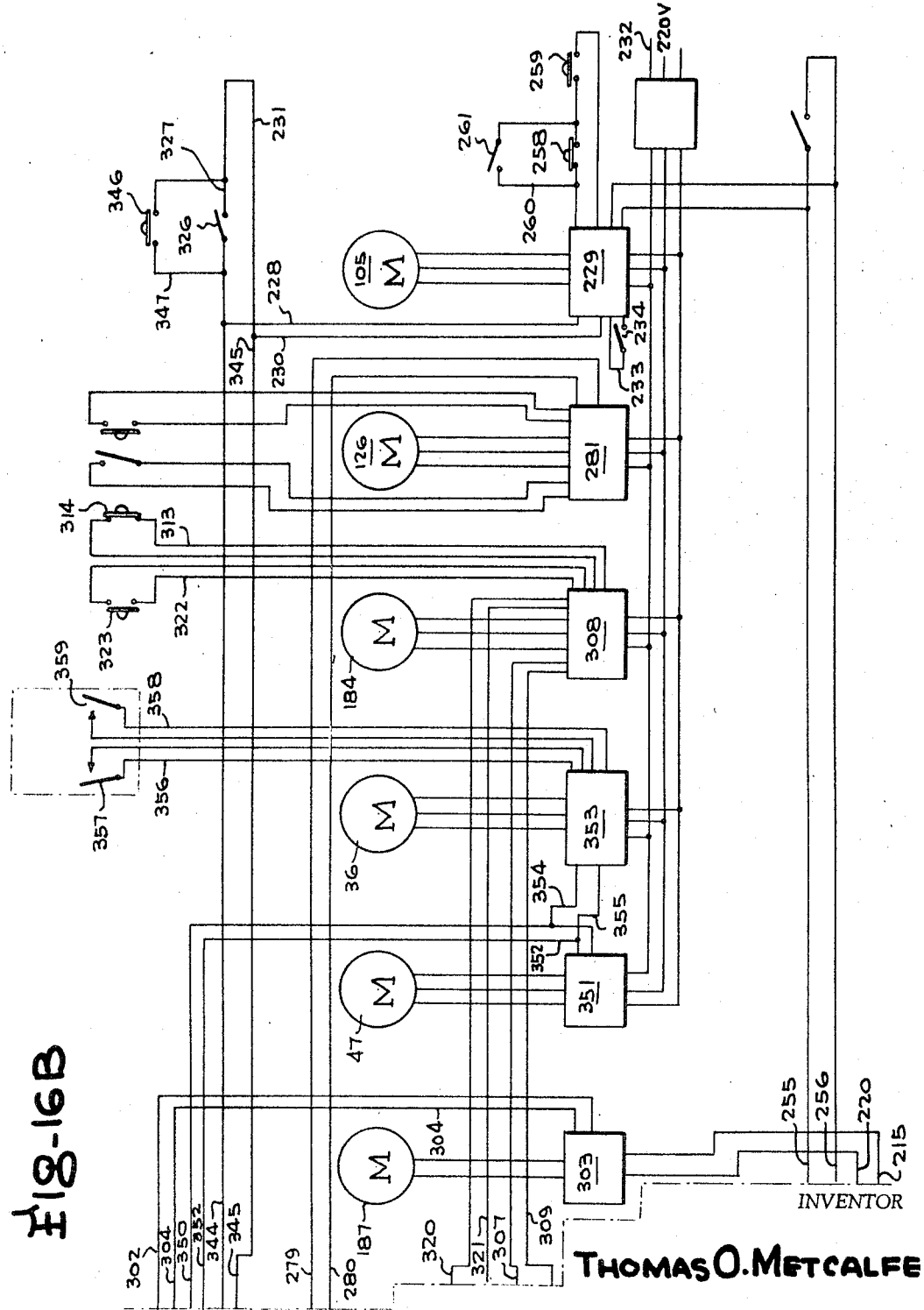

United States Patent Office 3,458,381
Patented July 29, 1969

3,458,381
MATTRESS PANEL CUTTING AND LABELING MACHINE
Thomas O. Metcalfe, Bluefield, Va., assignor to Metcalfe Brothers, Inc., Bluefield, Va., a corporation of Virginia
Filed Sept. 15, 1965, Ser. No. 487,546
Int. Cl. B65c *5/04;* B26d *7/14*
U.S. Cl. 156—510          18 Claims

ABSTRACT OF THE DISCLOSURE

A machine having means for supporting a roll of cloth and a carriage with jaws to grip the edge of cloth on the roll and draw it out a predetermined length. While the cloth is held in the jaws, a clamp adjacent the roll grips the cloth, and a cutter moves transversely across the cloth between the clamp and the roll to cut off the drawn-out length. Slitting knives cut the cloth to width as it is drawn out. Curved corner cutters may shape the edges prior to transverse cutting. Label applying mechanism picks up labels singly and moves them to a position over the cloth length and adheres them. Means detect misalignment of the cloth as it is drawn out and initiates operation of roll shifting means to correct alignment. The machine is adjustable to vary length and width of cut-off sheet.

---

This invention relates to machines for use in mattress making, and more particularly to machines for automatically cutting mattress panels to shape and size and applying labels to the cut panels.

It has been customary in mattress making to cut top and bottom panels, dust covers, and fabrics used inside mattresses on a cutting table. The cloth is laid out on the table in one or more layers and cut to size and shape by means of an electric knife. The cut top panels have a label applied at the center at one end, and a corner streamer label is applied to the same end. The labels have been placed in position and adhered to the panels by use of hand irons. Skilled workers are required to obtain the uniformity and speed required, yet, even under ideal conditions, these hand operations are relatively slow.

The general object of the present invention is to provide a machine which will automatically feed cloth to a cutting position, cut the cloth to size and shape, and apply the proper labels before releasing the panel for transportation to the sewing room.

A more specific object is to provide a machine of this nature which is capable of cutting panels for different size mattresses.

Another object is the provision of a mattress panel cutting machine wherein means are employed for preserving for subsequent use strips of fabric cut from the cloth when cutting panels for narrow mattresses.

A further object of the invention is to provide a panel cutting and label applying machine in which the label applying mechanism can be programmed to apply labels to each panel cut, to every other panel cut, or to be completely inoperative.

Still another object of the invention is to provide a machine of this kind capable of automatically aligning the fabric widthwise of the machine to ensure proper movement of the fabric relative to the several operating mechanisms.

Other objects of the invention will become apparent from the following description of one practical embodiment thereof, when taken in conjunction with the drawings which accompany, and form part of, this specification.

In the drawings:
FIGURES 1A and 1B together illustrate in top plan a mattress panel cutting machine embodying the features of the present invention;

FIGURES 2A and 2B together show the machine in side elevation;

FIGURE 3 is a perspective view of a length of fabric showing a mattress panel being cut therefrom;

FIGURE 4 is a vertical, transverse section through the machine at the corner cutting station, and is taken on the line 4—4 of FIGURE 2B;

FIGURE 5 is a vertical, transverse section through the cut-off station, taken on the line 5—5 of FIGURE 2B;

FIGURE 6 is a vertical, transverse section showing part of the label applying mechanism and is taken on the line 6—6 of FIGURE 2B;

FIGURE 7 is a partial vertical, longitudinal section through the machine, taken on the line 7—7 of FIGURE 1B;

FIGURE 8 is a detail section illustrating the cloth gripping and advancing means;

FIGURE 9 is a section on the line 9—9 of FIGURE 8;

FIGURE 10 is a vertical, longitudinal section through the label transporting and affixing mechanism, and is taken on the line 10—10 of FIGURE 6;

FIGURE 11 is a vertical section taken on the line 11—11 of FIGURE 10;

FIGURE 12 is detail section showing the cloth roll aligning means, and is taken on the line 12—12 of FIGURE 1B;

FIGURE 13 is a section taken on the line 13—13 of FIGURE 12;

FIGURE 14 is a perspective view of one of the corner cutting mechanisms;

FIGURE 15 is a similar view with the cloth shown in place; and

Figure 1A:
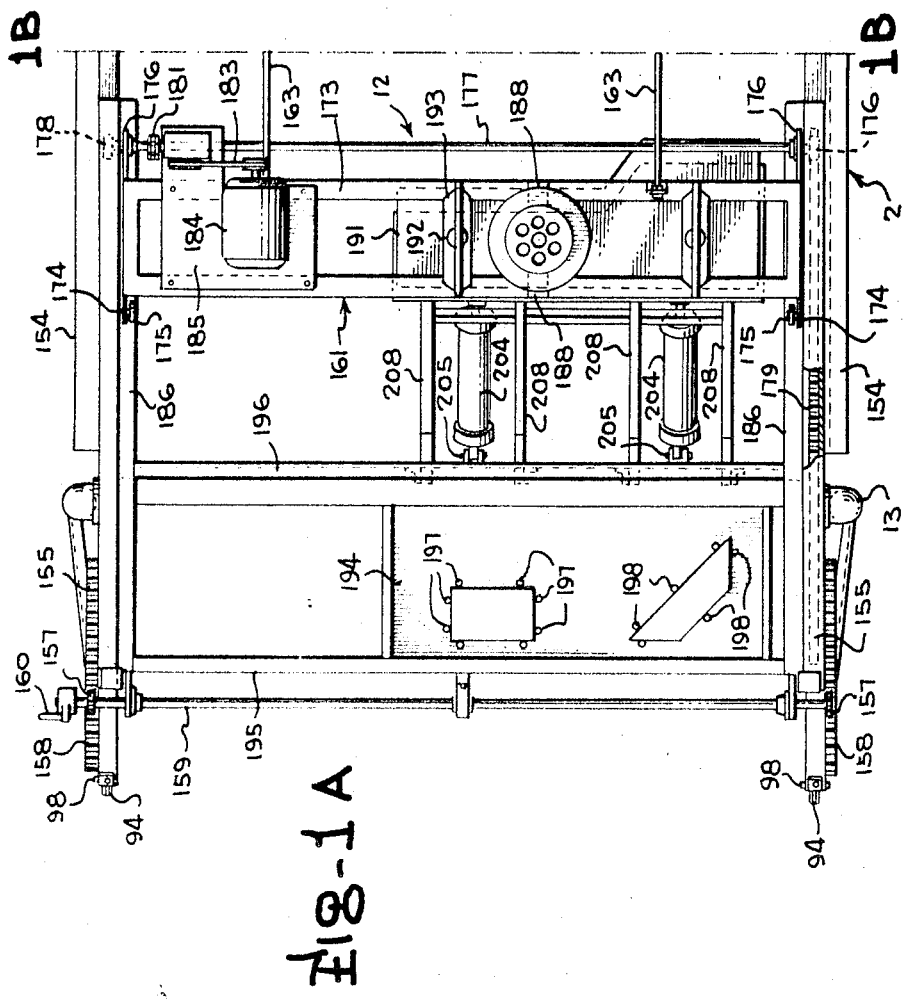
Figure 16A:
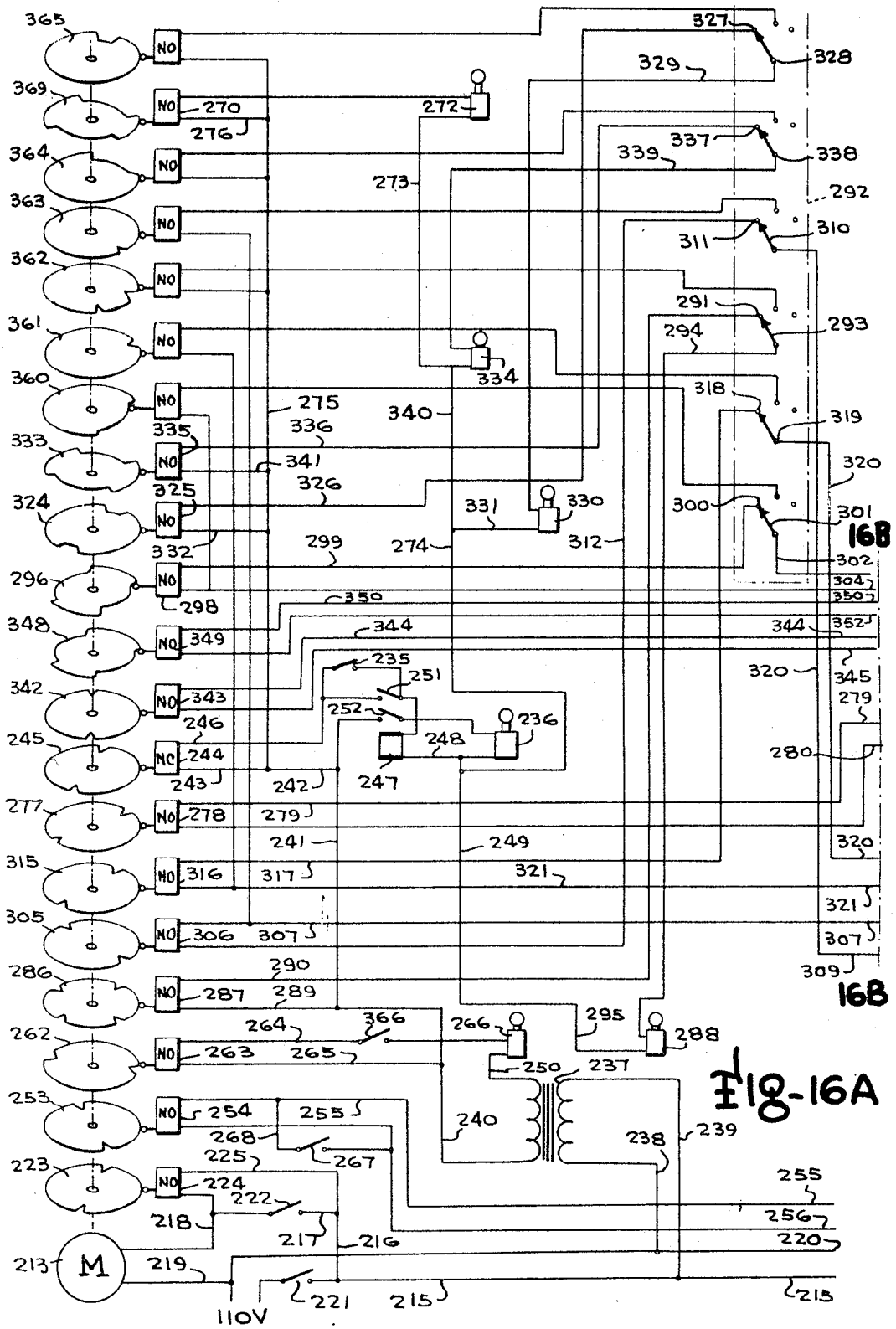

FIGURES 16A and 16B together illustrate a diagrammatic view of the control circuit for the machine.

In general, the machine of the present invention will mount a roll of cloth, from which mattress panels are to be cut, draw the cloth from the roll to a corner cutting station where generally V-shaped notches are cut in opposite edges of the cloth to define corners, advance the cloth to the length desired, again cut corners, and then advance the cloth to bring the last cut notches to a cut-off station where the panel is completely severed from the sheet. In addition, means are provided for transporting labels from a source of supply and affixing them to the sheet. The machine is adjustable to cut panels of different length and different width, and to permit accurate application of the labels on the different size panels. All of the operations are automatic, and the cloth roll is automatically adjusted for proper advance of the cloth along the machine.

Referring to the drawings in detail, the machine is shown as mounted upon a pair of frames 1 and 2. Frame 1 carries a cloth roll mount 3, a roll adjusting means 4, a width slitting station 5, corner cutting station 6, a cleaning brush 7, means for winding up cut-off strips of cloth 8, and a cut-off station 9. The frame 2 supports panel grippers 10, panel advancing means 11, and a label transporting and affixing mechanism 12. Frame 2 includes corner legs 13 which carry stabilizing bases 14. The bases are separated from one another to permit racks 15 for cut panels to be moved into and from panel-receiving position beneath the operating members of the machine.

Frame 1 is supported upon legs 16 stiffened by braces 17. Channel members 18 are carried by the legs, and these are connected by cross channels 19. Channels 18 are extended downwardly and forwardly to provide side arms 20 to support a cloth roll shaft 21. Arms 20 are braced by members 22 from legs 16. (See FIGURES 1B, 2B, 7, 12 and 13 for cloth roll mount and control.)

Brackets 23 are attached to the side arms, and carry pairs of spaced rollers 24, which lie normal to the longitudinal axis of shaft 21, with each pair forming a seat to receive the shaft and support it for rotation. The weight of cloth roll 25 will maintain the shaft seated in the rollers. The cloth roll is positioned on the shaft in conventional manner by cones 26. In order to permit adjustment of the cloth roll transversely of the machine, shaft 21 is also mounted on rollers 27 which are parallel to the longitudinal axis of the shaft and carried by wings 28 of brackets 23. By reason of this arrangement, the shaft is supported for rotation upon rollers 24, and for longitudinal movement upon rollers 27.

Transverse alignment of the cloth roll relative to the machine is obtained by means of the roll adjustment means 4 which includes a shifting fork 29, mounted on shaft 30 and having its fork end mounted in a groove 31 in a positioning sleeve 32 fixed to shaft 21. Shaft 30 extends from a speed reducer 33, fixed to frame 1, which is driven by belt 34 from a primary speed reducer 35, also mounted on the frame. Reducer 35 is driven from a motor 36 by belt 37. Motor 36 is controlled by an electric eye 38 mounted at one side of a horizontal cloth table 39, mounted above the frame 1, over which the cloth is drawn. If the cloth edge intercepts the electric eye controlling beam, motor 36 is energized to rock fork 39 to shift shaft 21 and move the cloth edge from beneath the electric eye. As soon as the cloth has moved a sufficient distance to withdraw its edge from beneath the electric eye, the motor will be shut off. This assures accurate cloth alignment.

As the cloth is drawn across the table 39 it is brought to the slitting station 5. (See FIGURES 1B, 2B and 7.) Here, several knives slit the cloth to desired width. There are two pairs of circular knives mounted on a knife shaft 40 which spans the machine and is supported in bearings 41 at the ends and at intermediate points. The table 39 has a transverse slot 42 at the slitting station so that the knives can project below the table surface and be free for adjusting movement lengthwise of shaft 40. The pairs of knives each consist of an inner knife 43 and an outer knife 44. These knives are held in positions of adjustment by means of set screws 45 in the knife hubs. It will be sufficient for the moment to state that two knives are used on a side so that a mattress panel and side cover strips can be cut simultaneously when cutting panels of single bed width. The specific adjustments of the knives will be described later in detail. For protection, covers 46 span the slot 42 in the regions of the knives.

The knives are rotated by means of a motor 47, suspended from frame 1, by means of a belt 48 which passes around a pulley 49 on shaft 40. The knives are driven at high speed to provide clean cuts as the cloth is drawn past the slitting station.

Just beyond the slitting station there are two corner cutting knives 50 which notch the side edges of the panel-width cloth. These are at the corner cutting station 6, and are located on opposite sides of the machine. (See FIGURES 1B, 2B, 4, 7, 14 and 15 for slitting station details.) The knives are substantially V-shaped, with the arms of the V being arcuate to provide the rounded corners which are conventional in mattress construction. The knives are mounted on carriages 51 which are movable transversely of the machine along rails 52 that extend between the side channels 18 of the frame 1. Each carriage has a base 53 slidable along rails 52 and held against sidewise displacement by guides 54 which depend from the base and bear against the inner edges of the rails 52. A leg 55 is arranged beneath the base for travel along an adjusting screw 56, journalled at one end in the side channel 18 and at the other in a cross-brace 59 extending between the rails 52. A crank 58 is secured to the screw, outside the frame, by which the screw can be rotated to advance the carriage along the rails.

Each carriage has a vertical bracket 59 with a horizontal platform 60, and also a pair of spaced, vertical arms 61 which project above the platform 60. An operating cylinder 62 is secured at its top to the free ends of arms 61, as at 63, and seats upon the platform 60. The piston rod 64 of the cylinder assembly extends downward through an opening 65 in platform 60, and carries the knife 50. On the carriage base, there is a fixed shear blade 66, having its upper surface in the horizontal plane of the table 39, and having a cutting edge conforming to the cutting edge of knife 50. The base 53 is cut out at 67 to permit material cut from the cloth to drop through the carriage. Table 39 ends adjacent the corner cutting station so as to leave the carriage freedom of movement. The cloth edges will be supported upon the fixed shear blades 66 in the area to be notched.

As mentioned above, when panels for single bed mattresses are being cut side panels are also cut from the cloth sheet. The side panel strips 68 are wound upon rolls 69 at either side of the machine. (See FIGURES 1B, 2B, 4 and 7.) The rolls are formed upon a shaft 70 supported in bearings 71 mounted on the legs 16 of frame 1. Side guards 72 are fixed to the shaft on either side to properly align the fabric on the rolls. A pulley 73 in shaft 70 carries a belt 74 which is driven by a speed reducer 75. The speed reducer, in turn, is driven by a belt 76 from the motor 47, which also drives the slitting knives 43 and 44.

After leaving the corner cutting station, the cloth passes over a channel 77, which spans the frame 1 and has its top surface in the horizontal plane of the cloth table 39, and, in effect, forms a continuation of the cloth table, and under the cleaning brush 7. (See FIGURES 1B, 2B and 7.) The brush assembly includes a brush back 78 that extends the width of the machine and carries bristles 79 on its underside. The brush back carries trunnions 80 at its ends which are seated in brackets 81 on the side channels 18. One trunnion, at least, is extended beyond its supporting bracket to permit attachment of a handle 82 by which the brush can be rocked from cloth-contacting position. A spring 83 attached at one end to the brush back and at the other to the side channel 18 yieldingly holds the brush in contact with the cloth.

The cloth is drawn along its path by means of the panel advancing means 11. This mechanism consists essentially of a pair of jaws 84 which are mounted on a carriage 85 movable along the frame 2. (See FIGURES 1A, 1B, 2A, 2B and 5 through 11.) The carriage (see particularly FIGURES 8 and 9) has a pair of wheeled members 86 connected by a pair of bars 87. Each of the wheeled members is in the form of a yoke 88 having a wheel 89 at each end. The wheels are adapted to run along the bottom flanges 90 of side channels 91, which form part of the frame 2 and are supported by legs 13. The bars 87 extend from the tops and bottoms of yokes 88 so that they are spaced apart. The carriage is drawn along the channels 91 by means of chains 92 which are connected to the yokes and pass over sprockets 93 at the front ends of the channels and sprockets 94 at the back ends. The return flights 95 of the chains pass through tubes 96 carried beneath the channels 91. Sprockets 93 are carried by short shafts 97, and sprockets 94 by shafts 98. Shafts 97 also carry sprockets 99 over which drive chains 100 are trained. Chains 100 pass around sprockets 101 on a shaft 102 supported by legs 13. This shaft has a sprocket 103 which is driven by chain 104 from a drive motor 105. Motor 105 is reversible, and its operation will cause chains 92 to move in one direction or the other, so as to carry the jaws 84 toward the cloth roll end of the machine to grip a severed cloth end (as will be described) and return them with the cloth end gripped between to draw out the cloth.

Jaws 84 are carried by pluralities of arms 106, with the arms supporting the upper jaw being pivotally connected to the upper bar 87 of the carriage 85 and the arms supporting the lower jaw being pivotally connected to the lower bar 87. The pivotal connections are shown at 107. In the region of the arms 106, pairs of spaced ears 108 are mounted between the bars 87 and project beyond the bars in a direction opposite to the projection of arms 106. Each pair of ears pivotally mounts one end of a cylinder assembly 109, as at 110. Each piston rod 111 is attached to one end of a pair of links 112, as at 113, with the links having their opposite ends connected to the respective arms 106 at 114. With the links and cylinders arranged as shown, extension of the piston rods will draw jaws 84 together into clamping relation, while retraction of the rods will separate the jaws and release the cloth.

After the cloth has been notched to form corners, it is drawn forward by the jaws 84 to bring the notches to the cut off station 9 where a knife 115 severs the cloth between the points of the V-shaped corner notches. (See FIGURES 1B, 2B, 5 and 7.) The knife is a circular blade which is mounted on a carriage 116 that travels along a track 117 supported from the channels 18 of the frame 1. The track is a horizontal member of an inverted U-shaped channel having upstanding legs 118 at opposite sides of the machine. Mounting channels 119 are connected to legs 118 and channels 18 of frame 1 to rigidly position the track.

Carriage 116 consists of a platform 120 that carries pairs of upstanding legs 121 and 122 in which wheels 123 and 124 are journalled. A yoke 125 suspended beneath the platform provides a seat for the cutter station motor 126. A depending strut 127 provides a mounting member for shaft 128 of the cutter blade 115. A bracket 129 is mounted on top of the platform and carries a speed reducer 130. The speed reducer has a shaft 131 which forms the axle for carriage wheel 124, and the reducer is driven by a belt 132 from motor 126. This provides a drive to wheel 124 to propel the carriage along the track. In order to supply power to both wheels, shaft 131 carries a pulley 133 and axle 134 supporting wheel 123 has a pulley 135, the two pulleys being connected by a belt 136. The cutter knife 115 is driven from the motor by belt 137. The motor is a reversible one, and the carriage can be propelled across the machine to sever the cloth strip and returned when the cloth is next advanced to cut off the next panel.

When a panel has been severed from the fabric strip its leading edge is still held by the jaws 84 of the panel advancing means, but it must be gripped at the trailing end to hold it horizontal during the label-applying operation. This is done by the panel grippers 10, which operate prior to the severing of the panel. (See FIGURES 1B, 2B, 5 and 7.)

There are two gripper jaws, a jaw 138 mounted above the plane of panel travel and a jaw 139 below the panel travel plane. Jaw 138 is an angle member extending the major distance across the machine. It is supported by a plurality of arms 140 mounted on a pivot shaft 141 journalled in bearings 142 on the tops of channel 91 of frame 2. Counterbalancing arms 143 project from shaft 141 oppositely to arms 140. Operating levers 144 are fixed to the shaft 141 and have their free ends connected to operating cylinders 145. The cylinders are anchored to the channels 91. Operation of the cylinders will raise and lower the jaw 138.

Jaw 139 has a similar mount, being connected by arms 146 to a shaft 147 journalled in bearings 148 on channels 18 of frame 1. Weights 149 counterbalance the jaw, and levers 150 fixed to shaft 147 control its movement. Cylinders 151 attached to the levers and to brackets 152 supported from a bar 153 between legs 13 of frame 2, supply the power to move jaw 139. Cylinders 145 and 151 operate in unison to move the respective jaws in opposite directions to either open or closed position.

During the operations performed by the apparatus previously described, the label transporting and affixing mechanism 12 moves to a source of label supply, picks up a center label and corner label, moves back to its starting position, and, when a cut panel is in place held by the jaws 84 of the panel advancing means and the jaws 138 and 139 of the panel gripper, deposits the labels upon the panel and later adheres them. (For this mechanism see FIGURES 1A, 1B, 2A, 2B, 6, 10 and 11.)

The label handling mechanism is supported upon the channels 91 of frame 2. To this end, track-forming angles 154 are mounted on the outer sides of channels 91, and adjustable channels 155 are supported above each channel 91. Channels 155 carry rollers 156 adjacent their ends to ride upon channels 91 to move channels 155 longitudinally of channels 91 to change the position of operation of the label handling mechanism relative to the cut off knife to accommodate panels of different length. Channels 155 are adjusted relative to channels 91 by means of pinions 157 which ride upon racks 158 fixed to the sides of channels 91. The pinions are on a shaft 159 carried by channels 155, and the shaft has a handle 160 for rotating it. Rotation of handle 160 moves pinions 157 along racks 158 and the channels 155 move along channels 91 on rollers 156.

The panel handling mechanism includes two carriages, a label transfer carriage 161, mounted for movement along channels 155, and a label adhering carriage 162, which travels on tracks 154. The two carriages are permanently joined by tie-rods 163 for simultaneous movement.

Carriage 162 has an inverted U-shaped frame 164 that has its leg ends attached to side bars 165. Wheels 166 are mounted at the ends of the side bars to run along track 154. Safety hooks 167 are connected to the side bars and extend under tracks 154 to prevent accidental separation of the carriage and track. Cylinders 168 are suspended from the top of frame 164 and have a pressure plate 169 secured to their piston rods for vertical movement toward and from the plane of the panels. To ensure level movement of the plate, toggle levers 170 are connected to the plate near its opposite ends, and the levers attached to a shaft 171 mounted in brackets on a brace bar 172 extending across the frame 164.

Carriage 161 has a main rectangular frame 173 having wheel supports 174 mounting wheels 175 at the corners of one long edge, and shaft supports 176 at the corners of the other long edge. A shaft 177 extends the length of the frame, through supports 176, and has pinions 178 on its ends. These pinions ride on racks 179 within channels 155 and propel the carriage longitudinally of the machine. Shaft 177 carries a sprocket 180 driven by chain 181 from a speed reducer 182. The speed reducer is driven by belt 183 from a motor 184. Both the motor and the speed reducer are mounted on a plate 185 fixed to the carriage frame 173. The wheels 175 support the other side of the frame by riding upon angles 186 carried by the channels 155.

A vacuum pump 187 is mounted on brackets 188 fixed to the carriage frame 173. The brackets are in two parts and adjustable lengthwise, as shown at 189. An accordion tube 190 connects the pump with a hollow pick-up head 191 movably supported below the carriage frame. The bottom surface of the head is perforated to allow for the entrance of air, as is conventional in vacuum heads. The head is connected to the piston rods of cylinder assemblies 192 suspended from supports 193 carried by the carriage frame. Operation of the cylinders will raise and lower the pick-up head to lift labels from a source of supply and lower them onto a panel in position beneath the carriage.

Labels are stored on a supply bed 194 mounted between cross braces 195 and 196 which extend between the channels 155 and hold them together. The labels are held in piles by pins 197, which define the center label shape, and pins 198, which define the corner label shape. The label piles are placed to hold the labels in the positions and relationship they will assume on the panel. The pins 197 extend from spring cylinders 199, and the pins 198 from spring cylinders 200. This arrangement holds the pins extended, yet permits them to be depressed by the vacuum head 191 to allow the head to contact the top label in the pile.

Brace 196 carries vertical supports 201 which are connected at their bottoms by connecting channel 202 and braced at the rear by braces 203 from the label supply bed 194. Cylinders 204 are pivotally connected to the channel 202, as at 205, and have their piston rods attached at 206 to a platen 207. The platen is swingably mounted on arms 208, pivotally connected to cross brace 196 at 209. Operation of cylinders 204 will swing platen 207 up beneath a panel and provide a base against which the pressure plate 169 may bear to press labels into adherence with the panels. Platen 207 is heated, as by coils 210.

As the carriage 161 is mounted on channels 155 and is tied to carriage 162, and the label supply bed and platen 207 are connected to these channels, movement of the channels to adjust for differest length panels will automatically adjust the entire label handling mechanism. It is to be noted that angle members 211 are connected to the angles 186 and project beneath the upper flanges of the channels 91 to lock the adjustable section to the main frame.

The automatic operations of all of the mechanisms described is controlled by a timer and control circuits located in a control box 212 fixed to the frame. The timer consists of a motor and a plurality of timer cams keyed on a single shaft driven by the motor.

FIGURE 16 shows diagrammatically the timer motor 213, its shaft 214, a series of cams on the shaft and the circuits for controlling the timer and controlled by the timer.

The timer motor is connected to a 110 v. power line 215 by by wires 216, 217 and 218, and by wire 219 to return line 220. A manual switch 221 controls the power line. The operation of the motor 213 is started by movement of the cloth advancing mechanism toward the brush 7 to grip the edge of cloth to draw it out to cut a panel. Movement of this mechanism to this position (to the right as shown) causes carriage 85 to strike, and close, switch 222 in the timer motor circuit. This will start the motor and begin rotation of the cams. Cam 223 will immediately close its switch 224 in a bridge circuit 225 across switch 222 to continue operation of the motor after carriage 85 leaves switch 222. At this time, the motor 105 of the cloth advancing means, which was energized originally by closure of a manual switch 226, continues to move the carriage to the right. Switch 226 is in a circuit which includes wires 227, 228, magnetic starting switch 229, lines 230 and 231. Closing switch 229 connects motor 105 to a 220 v. line 232 and closes a holding circuit 233 which includes a limit switch 234. When the carriage 85 reaches the limit of its travel to the right and is positioned with its jaws 84 overlying the edge of cloth at the plane of the cut off knife, it strikes switch 234 stopping motor 105.

At the time the carriage reaches the end of its travel it strikes a switch 235 which operates a solenoid valve 236 to cause cylinder 169 to operate to close jaws 84 to grip the cloth edge. Swith 235 is in the secondary circuit of a step-down transformer 237 which supplies the power for controlling the various air valves of the machine. The transformer primary is connected across the 110 v. line by wires 238 and 239. Wires 240, 241, 242 and 243 lead from the transformer secondary to a normally closed switch 244, controlled by cam 245, and wire 246, switch 235, relay coil 247 and wires 248, 249 and 250 complete the circuit back to the transformer. Energizing the relay coil closes switches 251 and 252. Switch 251 completes a bridge circuit around switch 235 to hold the relay energized, and switch 252 completes a circuit to the coil of solenoid valve 236 through wires 241 and and 249.

After the jaws 84 have gripped the cloth edge, timer cam 253 will close switch 254, completing a circuit through wires 255 and 256 to the starting switch 229 to start the carriage motor 105 in the opposite direction to draw cloth from the roll and across the cut off station. At the same time a holding circuit is set up through wire 257 which includes limit switches 258 and 259. A bridge 260, including a manual switch 261, is made around switch 258 for a purpose to be described.

The carriage 85 continues to move to the left until the edge gripped by the jaws 84 is at a distance from the corner cutting station 6 equal to the length of the panel to be formed. At this point, the carriage will strike, and open, switch 258 and stop motor 105. At this time, cam 262 will close momentarily its switch 263 completing a circuit through wires 264, 265, 240 and 250 to energize solenoid valve 266 from transformer 237 to actuate the corner cutting cylinders 62 to move the cutters 50 downwardly and cut the corner notches in the cloth. Switch 263 will open and the spring loaded valve 266 will reverse lifting the cutters. As the cutters move to inactive position, a switch 267 on the cutter frame will be closed momentarily to restart motor 105 in cloth advancing direction. Switch 267 is in a bridge circuit 268 across wires 255 and 256. This will cause the jaw carriage 85 to again move to the left to draw the corner notches to the cut off station. When this point is reached, carriage 85 will strike, and open, switch 259 to stop motor 105.

At this time two things occur. The cloth gripping jaws 138 and 139 close to hold the trailing edge of the cloth, to prevent misalignment during cutting and to hold the trailing edge of the panel when cut, and the cut off knife 115 severs the cloth between the apices of the previously cut corner notches.

Jaws 138 and 139 are controlled by a cam 269 on the timer. Cam 269 closes switch 270 which closes a circuit including wire 271, coil of solenoid valve 272, wires 273, 274, 249, 250, the secondary of transformer 237, and wires 240, 241, 242, 275 and 276. This will operate cylinders 145 and 151 to bring the jaws to clamping position.

Cam 277 controls the operation of the cut off motor 126. This motor rotates the cut off knife 115 and propels the knife carriage 116 across the machine. The cam closes switch 278 which is connected by wires 279 and 280 to a starting switch 281 for motor 126. Reversing lines 282 with switch 283, and 284 with switch 285 control the direction of carriage 116. If switch 283 is closed, as shown, the carriage will carry the knife across the cloth in one direction making a cut, and when the carriage reaches the end of its travel it opens switch 283 to stop its movement, and closes switch 285 to prepare the circuit for reverse operation when the cam 277 next closes switch 278.

The panel will now be cut and held in horizontal position by the advancing jaws 84 at one end, and the clamping jaws 138 and 139 at the other end.

During the operation previously described, the label transporting and adhering unit was first in a position where the transfer carriage 161 was over the label supply bed 194. While in that position, cam 286 of the timer closed its switch 287 to complete a circuit through the coil of a solenoid 288 which controls the movement of the cylinders 192 which raise and lower the vacuum head 191. This circuit includes the transformer 237, lines 240, 289, switch 287, line 290, contact 291 of a three position gang switch 292, movable contact arms 293 of switch 292, line 294, solenoid coil 288 and lines 295 and 250. This will cause the vacuum head to lower to pick up a center and corner label.

Prior to lowering the vacuum head, cam 296 will have closed its switch to start the vacuum pump 187 and open control valve 297 in the vacuum tube 190. The pump starting circuit includes cam switch 298, line 299, contact 300 of gang switch 292, movable switch arm 301, line 302, starting switch 303 and line 304.

After the vacuum head picks up the labels, switch 287 opens allowing the head-controlling valve to reverse and lift the head. The vacuum remains on to hold the labels to the head.

At that time, a cam 305 closes its switch to start the transfer motor 184 to move the transfer carriage to the right, to the position shown on the drawings, where the label is to be deposited on the panel. This circuit has the switch 306, line 307, starter switch 308, line 309, movable contact 310 of gang switch 292, contact 311 and line 312. The starter has a holding circuit 313 with a limit switch 314 which is struck by the carriage and opened to stop the motor when the carriage is at its label depositing position.

When the transfer carriage is at this position the cut panel is beneath it. Cam 286 will again act to close switch 287 and lower the vacuum head to the panel. Cam 296 will allow its switch 298 to open and the labels will be released to lie in place on the panel.

A cam 315 will then close its switch to start motor 184 in reverse direction to move the transfer carriage back to the label bed and to move the adhering carriage 162 over the labels on the panel. The circuit for this includes switch 316, line 317, contact 318 of gang switch 292, movable contact 319 of that switch, line 320, starter switch 308, and line 321. A holding circuit 322 for this control is also provided, and it has a limit switch 323 which is struck and opened when the transfer carriage reaches its original position.

When the carriage 162 is over the labels on the panel, its pressure plate 169 is lowered into contact with the labels and held for a brief period. This is controlled by cam 324 of the timer. The circuit is from cam switch 325, line 326, contact 327 and movable contact 328 of gang switch 292, line 329, coil of solenoid valve 330, and lines 331, 274, 249 and 250 to transformer 237, and lines 240, 241, 242 and 275 to line 332. This will activate cylinders 168 to lower plate 169.

While plate 169 is lowering, the heated platen 207 will be raised to apply pressure contact to the panel and labels to cause the labels to adhere to the panel. Platen 207 is controlled by cam 333. Solenoid valve 334 is in a circuit including cam switch 335, line 336, contact 337 and movable arm 338 of gang switch 292, lines 339, coil of solenoid valve 334, lines 340, 274, 249, 250, transformer 237, lines 240, 241, 242 and 275 to 341.

After the desired period of heat and pressure, switches 325 and 335 open allowing the valves 330 and 334 to shift to raise the pressure plate 169 and lower platen 207.

When the platen is out of the way, cam 245 will operate to open its switch 244 and cam 269 will allow its switch 270 to open, breaking the circuits to valve coils 236 and 272 to reverse the valves and open jaws 84 and jaws 138 and 139, thus releasing the ends of the completed panel. The panel will then drop on the rack 15.

Cam 342 will then close its switch to start the cloth advancing means motor to move the jaws 84 back to the right to start another cycle. This circuit includes switch 342, lines 344, 228, starter switch 229, and lines 230 and 345. As this circuit will also energize the holding circuit 233, the opening of switch 234 when the jaw carriage reaches its cloth-gripping position will stop motor 105.

Timer cam 223, as are all the cams described so far, is arranged for two cycles per revolution, and will shut off the timer motor when it has made one half revolution. If only one cycle is desired, switch 226 will be opened after the initial impulse to start the machine, and when the jaw carriage starts its return trip it will open a switch 346 in a bridge 347 about switch 226 and stop the machine. With switch 346 open it will be necessary to restart the machine by closing switch 226. If it is desired to repeat the cycle automatically switch 226 will be left closed and the opening of switch 345 will be ineffectual. Although the timer will stop when it has completed one-half revolution, it will be started by carriage 85 closing switch 222.

It is necessary for the knives of the slitting station 5 to be operative when the cloth is being drawn from the roll so that the cloth will be cut to proper width. It is also necessary that the cloth roll adjusting motor 36 have power at this time so that it may be operative when the electric eye signals an adjustment is required. The slitting knife motor 47 and the roll adjusting motor 36 are both controlled by a cam 348. The circuit is through cam switch 349, line 350, slitter motor starting switch 351 and line 352. Roll control starter switch 353 is coupled across lines 350 and 352 by lines 354 and 355. Although this sets up the circuit to motor starter 36, the circuit is under the control of electric eye lines 356 with electric eye 357 and 358 with electric eye 359.

As mentioned above, the timer is set for two cycles per revolution, and as thus far described there will be a label applied to each panel cut. As it is desirable on many occasions to apply labels only on alternate panels (where no label is attached to mattress back panels) means are provided to cause the label transfer and adhering mechanism to operate only on every other cycle of the panel cutting means. This is done through the gang switch 292. By shifting the switch arms to the second position, cams 286, 296, 305, 315, 324 and 333 are no longer operative to control the labeling operations, but cams 360, 361, 362, 363, 364 and 365 control. These latter cams are designed to be operative but once per revolution.

If no labeling is required, the gang switch 292 is moved to the third position which removes the label handling mechanism from the circuit. If no corner cutting is desired, the switch 261 may be closed so that the cloth advancing means will not be stopped by the opening of switch 258 but will continue to full panel length. When no corner cutting is to be done, a switch 366 is opened to prevent operation of the cutters.

It will be clear from the above that the machine is quite versatile as it is capable of applying labels to every panel, every other panel, or to none of the panels. It can cut rounded corners or not as desired. The slitting knives can be adjusted to cut panels of various widths, and when cutting single bed size can cut side panels as well. The corner cutters are also adjustable for various width panels. The frame, and the label handling means can be adjusted lengthwise to permit cuting panels of different length. When this last adjustment is made, the switches 258 and 259, controlling the travel of the cloth advancing jaws, are automatically adjusted also.

The panel 367 cut by the machine is shown in FIGURE 3. It will have the usual rectangular shape with rounded corners 368 if the corner cutters are used. The central label 369 will be at the center of one end, and the corner label 370 across an adjacent corner.

It is believed that the operation of the machine will be clear from the above description and that no review of the operation apart from the structure is required.

While in the above one practical embodiment of the invention has been disclosed, it will be understood that the details of construction shown and described are merely by way of illustration, and the invention may take other forms within the scope of the appended claims.

What is claimed is:

1. A mattress panel cutting machine comprising, an elongated frame, means on the frame to support a roll of cloth, means to grip the edge of the cloth and draw it along the frame, means on the frame to clamp the cloth intermediate the roll supporting means and the cloth gripping means, means movable transversely across the frame adjacent the clamping means and intermediate the clamping means and roll supporting means to sever cloth drawn from the roll, means on the frame to support a supply of labels, means movable on the frame to positions overlying the label support and overlying the cloth length between the gripping means and clamping means to pick up labels from the label support and deposit them on the cloth.

2. A mattress panel cutting machine as claimed in claim 1 wherein, there are means carried by the frame above and below the plane of the cloth held by the gripping means and clamping means and movable into pressure contact with the cloth and label thereon to adhere the label to the cloth.

3. A mattress panel cutting machine as claimed in claim 2 wherein, there are means to release the cloth gripping means and cloth clamping means from the cloth to discharge the severed cloth length.

4. A mattress panel cutting machine as claimed in claim 3 wherein, there are means to adjust the length of the frame and shift the movable path of the label pick up and deposit means, and means to control the length of travel of the cloth gripping means in accordance with the adjusted position of the frame.

5. A mattress panel cutting machine as claimed in claim 1 wherein, there are slitting knives intermediate the severing means and the roll supporting means to cut the cloth to predetermined width as the cloth is drawn along the frame.

6. A mattress panel cutting machine as claimed in claim 5 wherein, the slitting knives are movable transversely of the machine to vary the cut cloth width.

7. A mattress panel cutting machine as claimed in claim 1 wherein, there are corner cutting means on opposite sides of the frame to notch the cloth edges to desired panel corner contour prior to severance of a panel from the cloth.

8. A mattress panel cutting machine as claimed in claim 7 wherein, the corner cutting means are mounted for movement toward and from one another for adjustment to various widths of cloth.

9. A mattress panel cutting machine comprising, an elongated frame, means on the frame to support a roll of cloth from which panels are to be cut, gripping means movable longitudinally of the frame to grip the edge of the cloth and draw it along the frame to a predetermined position, slitting knives on opposite sides of the machine along the path the cloth is drawn by the grippers to cut the cloth to desired width, corner cutters on opposite sides of the machine to notch the edges of the cloth to desired corner contour, clamping means on the frame intremediate the gripping means when in said predetermined position and said corner cutters to clamp the cloth drawn from the roll, severing means adjacent the clamping means on the side away from the gripping means to cut the cloth transversely to panel length, and means to release the gripping means and clamping means to discharge cut panels from the machine.

10. A mattress panel cutting machine as claimed in claim 9 wherein, there are means to detect misalignment of a cloth roll on the support means, and means responsive to the detection means to shift the roll of cloth transversely of the machine.

11. A mattress panel cutting machine as claimed in claim 9 wherein, there are means on the frame to support a supply of labels, means movable on the frame to positions overlying the label support and overlying a length of drawn out cloth between the gripping means and the clamping means to pick up labels from the label support and deposit them on the cloth length.

12. A matteress panel cutting machine as claimed in claim 11 wherein, the means to pick up and deposit labels includes a carriage movable longitudinally of the frame to said position, a vacuum source on the carriage, a vacuum head connected to the vacuum source and movable to the label support to pick up labels and to the cloth to place labels on the cloth, and means to shut off communication between the vacuum head and vacuum source to release labels from the vacuum head.

13. A mattress panel cutting machine as claimed in claim 12 wherein, there is a label adhering carriage movable with the label pick up carriage to overlie labels deposited on the cloth when the label pick up carriage is over the label support, a pressure plate carried by the label adhering carriage movable into contact with labels on the cloth lengths, a platen below the plane of the cloth length held between the gripping means and clamping means and movable into contact with the underside of the cloth length, and means to move the pressure plate and platen into pressure contact with opposite sides of the cloth length and label.

14. A mattress panel cutting machine as claimed in claim 13 wherein, the frame is adjustable lengthwise to shift the label support and the movable path of the label pick up and depositing carriage toward and from the cloth severing means, and means to vary the predetermined position of gripping means travel in accordance with the adjustment of the frame, whereby panels of different length may be cut.

15. A mattress panel cutting machine as claimed in claim 9 wherein the gripping means includes a carriage movable along the frame, jaws movably supported on the carriage and extending the major portion of the width of the machine, and means on the carriage to move the jaws to and from gripping relation.

16. A mattress panel cutting machine as claimed in claim 9 wherein, the clamping means includes a jaw pivotally supported on the frame above the plane of cloth drawn along the frame, a jaw pivotally mounted on the frame below the cloth plane, and means to move the jaws to and from cloth engaging position.

17. A mattress panel cutting machine as claimed in claim 9 wherein, the cloth severing means includes a carriage movable transversely across the frame, a rotatable knife mounted on the carriage traversing the plane of cloth drawn along the frame, and means to rotate the knife and propel the carriage across the frame.

18. A mattress panel cutting machine as claimed in claim 9 wherein, the slitting knives are rotary knives arranged in pairs on opposite sides of the machine, and there is a shaft extending across the frame on which the knives are mounted, the knives being adjustably mounted on the shaft to permit cutting the cloth to various widths.

References Cited

UNITED STATES PATENTS

| | | | |
|---|---|---|---|
| 3,009,664 | 11/1961 | Huck | 242—57.1 |
| 3,232,547 | 2/1966 | Thiede et al. | 242—57.1 |
| 1,868,226 | 7/1932 | Draher et al. | 83—277 |
| 2,651,429 | 9/1953 | Von Hofe | 156—572 |
| 2,988,129 | 6/1961 | Kevelin et al. | 156—273 |
| 3,296,911 | 1/1967 | McLane | 83—408 |

DOUGLAS J. DRUMMOND, Primary Examiner

U.S. Cl. X.R.

83—277, 282, 408; 156—572; 242—57.1